(12) United States Patent
Kim et al.

(10) Patent No.: US 12,129,123 B2
(45) Date of Patent: Oct. 29, 2024

(54) WITHDRAWAL SYSTEM FOR WITHDRAWING ITEMS FROM PACKAGING BOX

(71) Applicant: CJ CHEILJEDANG CORPORATION, Seoul (KR)

(72) Inventors: Myung Ho Kim, Jincheon-eup (KR); Sung Woo Park, Jincheon-eup (KR); Bong Yong Sung, Gimhae-si (KR); Hee Dong Son, Changwon-si (KR); Dae Hwa Kim, Osan-si (KR); Sun Kyu Kim, Hwaseong-si (KR); Soo Hyun Kim, Gimpo-si (KR); Hak Dong Kim, Suwon-si (KR); In Soo Jung, Suwon-si (KR)

(73) Assignee: CJ CHEILJEDANG CORPORATION, Seoul (KR)

( * ) Notice: Subject to any disclaimer, the term of this patent is extended or adjusted under 35 U.S.C. 154(b) by 137 days.

(21) Appl. No.: 17/801,106

(22) PCT Filed: Feb. 19, 2021

(86) PCT No.: PCT/KR2021/002125
§ 371 (c)(1),
(2) Date: Aug. 19, 2022

(87) PCT Pub. No.: WO2021/167400
PCT Pub. Date: Aug. 26, 2021

(65) Prior Publication Data
US 2023/0108345 A1     Apr. 6, 2023

(30) Foreign Application Priority Data
Feb. 19, 2020   (KR) .................. 10-2020-0020678

(51) Int. Cl.
*B65G 15/12*   (2006.01)
*B65G 47/244*  (2006.01)
*B65G 47/91*   (2006.01)

(52) U.S. Cl.
CPC ........... *B65G 15/12* (2013.01); *B65G 47/244* (2013.01); *B65G 47/912* (2013.01);
(Continued)

(58) Field of Classification Search
CPC .... B65G 15/12; B65G 47/244; B65G 47/912; B65G 47/918; B65G 2203/0208;
(Continued)

(56) References Cited

U.S. PATENT DOCUMENTS 5,222,861 A * 6/1993 Focke ................ B65B 43/46
414/811
5,609,236 A * 3/1997 Neukam ............. B65G 47/54
198/370.1
(Continued)

FOREIGN PATENT DOCUMENTS

DE    4030215 A  * 3/1992 ........... B65B 43/46
DE    4030215 A1   3/1992
(Continued)

OTHER PUBLICATIONS

International Search Report from WIPO in related Application No. PCT/KR2021/002125 dated Jun. 15, 2021, 8 pages.
(Continued)

*Primary Examiner* — Gene O Crawford
*Assistant Examiner* — Abby A Jorgensen
(74) *Attorney, Agent, or Firm* — DILWORTH IP, LLC

(57) ABSTRACT

A system for taking out items wrapped in a packaging film and accommodated in a packaging box with an open top. The system includes a first conveyor configured to transfer a packaging box accommodating items therein, a fixing
(Continued)

device for fixing, at a withdrawal position where the items are taken out of the packaging box, the packaging box transferred by the first conveyor with its top open, a withdrawal device for moving to a space in which the items are accommodated in the packaging box so as to suck the same using vacuum suction and take out the same, an item transfer device for transferring the items taken out by the withdrawal device with the items placed on the item transfer device, and a box transfer device for transferring an empty packaging box from which the items are taken out.

4 Claims, 5 Drawing Sheets

(52) U.S. Cl.
CPC .... B65G 47/918 (2013.01); *B65G 2203/0208* (2013.01); *B65G 2203/042* (2013.01); *B65G 2207/14* (2013.01)

(58) Field of Classification Search
CPC .......... B65G 2203/042; B65G 2207/14; B65G 2201/0232; B65G 2201/0276; B65G 47/53; B65G 59/04; B65G 65/00; B65G 47/91; B65G 37/00; B65G 47/848; B65G 2201/02; B65G 2812/017; B65B 69/00
See application file for complete search history.

(56) References Cited

U.S. PATENT DOCUMENTS

| | | | |
|---|---|---|---|
| 2011/0103924 A1* | 5/2011 | Watt | B65G 49/00 414/800 |
| 2013/0125517 A1* | 5/2013 | Gomi | B65B 69/0033 53/381.1 |
| 2013/0247524 A1* | 9/2013 | Ford | B65B 43/126 53/381.1 |
| 2020/0039746 A1* | 2/2020 | Lert, Jr. | B65B 21/00 |

FOREIGN PATENT DOCUMENTS

| | | | | |
|---|---|---|---|---|
| DE | 19838076 A1 | | 2/2000 | |
| DE | 102016220642 A1 | * | 4/2018 | ............ B31B 50/81 |
| EP | 0528772 A1 | * | 2/1993 | |
| EP | 0744362 A2 | * | 11/1996 | |
| JP | 08002681 A | * | 1/1996 | |
| JP | 09249207 A | * | 9/1997 | |
| JP | 2002068472 A | * | 3/2002 | |
| JP | 2003136458 A | * | 5/2003 | |
| JP | 2003212202 A | * | 7/2003 | |
| JP | 2009102058 A | * | 5/2009 | |
| KR | 10-1999-0000278 A | | 1/1999 | |
| KR | 20040029929 A | * | 4/2004 | |
| KR | 20110000614 U | * | 1/2011 | |
| KR | 20-2011-0000614 U | | 7/2011 | |
| KR | 101739850 B1 | * | 6/2017 | |
| KR | 10-2134337 B1 | | 7/2020 | |
| WO | 2011038376 A1 | | 3/2011 | |
| WO | WO-2013184295 A1 | * | 12/2013 | ........... B65B 43/126 |
| WO | WO-2020027170 A1 | * | 2/2020 | |

OTHER PUBLICATIONS

Extended European Search Report issued in European Patent Application No. 21756432.7, mailed Aug. 10, 2023.

* cited by examiner

WITHDRAWAL SYSTEM FOR WITHDRAWING ITEMS FROM PACKAGING BOX

FIELD OF THE INVENTION

The present disclosure relates to a system for taking items out of a packaging box, and more particularly, to a system for taking out items wrapped in a film and accommodated in a packaging box with an open top.

BACKGROUND OF THE INVENTION

Rectangular parallelepiped boxes are widely used as packaging containers for transporting and storing items.

FIG. 1 illustrates a type of packaging box that is used widely.

The packaging box, which is designated by reference numeral 1, is mainly made of paper coated with a synthetic resin film and has a top and a bottom, which are each covered by four panels extending from the side of the packaging box so that the packaging box is closed.

Since the top and bottom of the packaging box have the same structure, the top thereof will be described with reference to FIG. 1. The top of the packaging box is closed by folding the four panels 2 to 5, which consist of two pairs of panels, from the respective side edges thereof so that the ends thereof abut against or are adjacent to each other. A pair of panels 4 and 5 are folded facing each other and the other pair of panels 2 and 3 are then folded facing each other so that these pairs of panels are placed vertically.

In this way, the top of the box is closed. The packaging box is closed so as not to be opened by an external force by binding the abutting ends of the first pair of panels 2 and 3 folded and placed upward with an adhesive tape.

The bottom of the packaging box is configured and closed in the same manner as the top thereof. After items are inserted from above and accommodated in the packaging box, the packaging box is closed by folding the upper panels 2 to 5 and binding the ends of the pair of panels 2 and 3 with the adhesive tape, as described above. The closed packaging box is transported.

On the other hand, when it is intended to open the packaging box accommodating items to take the items out thereof, the adhesive tape that binds the panels 2 and 3 is cut. Subsequently, the top of the packaging box is opened by unfolding all the panels 2 to 5 outward and the item in the packaging box is then taken out.

There is no problem in the case where the items in the packaging box are general consumer items. However, in the case of items used in a manufacturing process for mass production, it is a very simple operation to align and transfer the items in a specific direction in order to take the items out of the packaging box and insert them into the manufacturing process, but it requires a lot of labor and increases costs to manufacture.

Meanwhile, Korean Patent No. 10-1554009 (Document 1) discloses an invention entitled "PACKAGING BOX WITH WINDOW STRUCTURE FOR TAKING OUT STICK CONFECTIONERY PRODUCT". The packaging box in Document 1 presents a configuration that makes it easy to take out items accommodated in the packaging box.

However, the packaging box in Document 1 only discloses a configuration that makes it convenient for a consumer to store items in the box and then take out the items one by one when necessary, and does not disclose a configuration suitable for taking a large number of items out of the packaging box required in a manufacturing process for mass production.

In addition, Korean Patent No. 10-1527654 (Document 2) discloses an invention entitled "PACKAGING BOX FOR EASY WITHDRAWAL OF ITEM". The packaging box in Document 2 proposes a structure that makes it easy to take out items.

However, the packaging box in Document 2 is easily opened and makes it easy to take out items, but it does not disclose a configuration or device for automatically performing withdrawal operation.

As such, the prior art proposes a technique for easily taking out the items accommodated in the packaging box, and the packaging box has a special form for easy withdrawal. However, there is no disclosure or consideration for a system capable of automatically taking items out of a common structured packaging box.

SUMMARY OF THE INVENTION

Technical Problem

Various embodiments are directed to a system for taking items out of a packaging box.

Specifically, various embodiments are directed to a system for automatically taking items out of a packaging box with an open top and aligning the taken-out items to be transported to a place of use.

In particular, various embodiments are directed to a system for taking out items configured, when a plurality of directional items are accommodated in a packaging box, to detect the directionality of the items accommodated in the packaging box and to align the taken-out items in one direction.

Technical Solution

In an embodiment, there is provided a system for taking out items wrapped in a packaging film and accommodated in a packaging box with an open top.

The system according to the present disclosure comprises: a first conveyor configured to transfer a packaging box accommodating items therein; a fixing means for fixing, at a withdrawal position where the items are taken out of the packaging box, the packaging box transferred by the first conveyor with its top open; a withdrawal means for moving to a space in which the items are accommodated in the packaging box so as to suck and take out the items; an item transfer means for transferring the items taken out by the withdrawal means with the items placed on the item transfer means; and a box transfer means for transferring an empty packaging box from which the items are taken out.

In various embodiments of the present disclosure,

The packaging box may be transferred in a first direction to the withdrawal position by the first conveyor.

The empty packaging box from which the items are taken out may be transferred in a second direction perpendicular to the first direction by the box transfer means. The first conveyor may include two conveyor belts extending parallel to each other in the first direction. The box transfer means may be composed of a second conveyor disposed beneath between the conveyor belts of the first conveyor at the withdrawal position, and after the items are taken out of the packaging box by the withdrawal means, the box transfer means may rise above the conveyor belts of the first conveyor and be driven in contact with the bottom of the packaging box to transfer the empty packaging box in the second direction.

In various embodiments of the present disclosure,

The items may be stacked to form a cylinder as a whole, and be arranged in the packaging box such that the stacked item in the cylindrical form has an axis parallel to the direction transferred by the first conveyor. The withdrawal means may be provided with a concave arc-shaped suction surface having a diameter corresponding to the diameter of each item, and the suction surface may be provided with a through-hole in communication with an external vacuum source for suctioning the packaging film of the item by vacuum.

In various embodiments of the present disclosure,

The item may have both longitudinal ends having different diameters, and the withdrawal means may be provided with a sensor configured to detect the diameter of one end of the item.

In various embodiments of the present disclosure,

The sensor may include a bar disposed at one longitudinal end of the item to be pressed and protrude toward the axis of the item in a radial direction of the item, and the sensor may detect which end of both ends of the item is in contact with the bar according to the protruding length of the bar.

In various embodiments of the present disclosure,

The item transfer means may include a third conveyor, on which the item taken out by the withdrawal means is placed and transferred, and a rotating device on which the item taken out by the withdrawal means are placed and rotated by 180 degrees.

When the diameter of one end of the item detected by the sensor is different from the diameter of one end of another item, the withdrawal means may load the associated item onto the rotating device, and suck and load the associated item onto the third conveyor after the rotating device rotates.

Advantageous Effects

According to the configuration of the present disclosure, the item accommodated in a packaging box is taken out by a withdrawal means rather than an operator while the direction of the item is maintained, and is placed on and transferred by an item transfer means to handle the item in a subsequent process. Since an empty packaging box from which the item is taken out is also automatically transferred to the subsequent process, there is no need for the operator to remove the empty packaging box. As such, all operations are performed automatically.

According to this configuration, since the empty box from which the item is taken out is transferred in a direction different from the item transfer direction, there is no interference with the transfer path of the item. In addition, a box transfer means is disposed in the transfer path of the packaging box and has a simple configuration. Accordingly, the box transfer means can operate without interfering with the transfer of the packaging box to transfer the empty packaging box.

Such a configuration is suitable for taking out items in a cylindrical form as a whole. In particular, through the simple configuration that provides a plurality of suction surfaces, it is possible to take out several items at the same time.

According to such a configuration, even when an item has directionality, a simple sensor may detect the directionality of the item and an error in the arrangement of the item, thereby allowing a withdrawal means to properly place the item on the item transfer means.

When the sensor detects the directionality of the item, there is provided a rotating device for changing the direction of the item. Thus, the system is simplified as a whole by rotating the item by the rotating device, without a complicated configuration such as the withdrawal means being rotated to correct the direction of the item.

DETAILED DESCRIPTION OF THE INVENTION

Hereinafter, the configuration and operation of a system for taking out items according to an embodiment of the present disclosure will be described in detail with reference to the drawings.

First, the overall configuration and arrangement of a system for taking items out of a packaging box according to an embodiment of the present disclosure will be described with reference to FIGS. 2 and 3.

Figure 1:
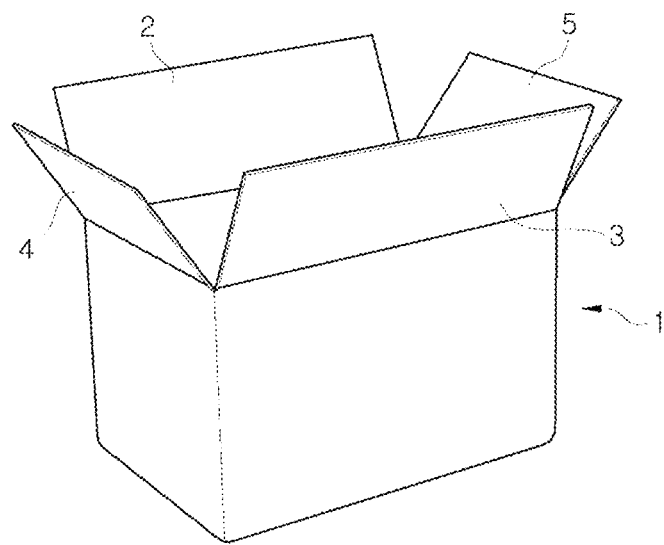
FIG. 1 is a perspective view illustrating an open state of a type of packaging box used in a system for taking out items according to an embodiment of the present disclosure.

The system of the present embodiment is configured to take items out of the packaging box as illustrated in FIG. 1. The items accommodated in the packaging box to be taken out by the system of the present embodiment are an in-line container 6 as in the perspective views of FIGS. 4 and 5 and in the cross-sectional view of FIG. 6.

Figure 6:
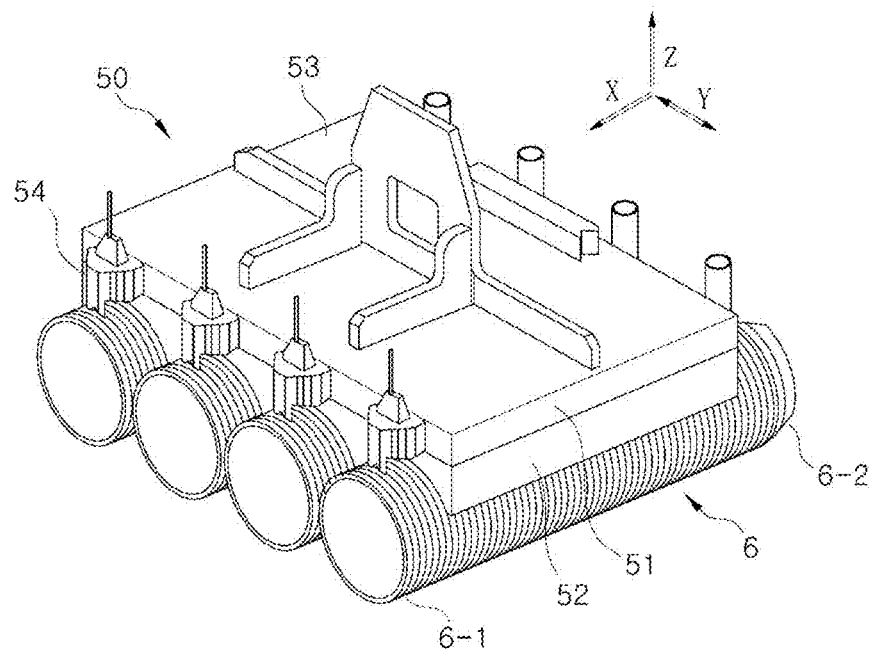
FIGS. 6 and 7 are perspective and top views illustrating a clamp in the system according to the embodiment of the present disclosure.

The in-line container 6 illustrated in FIG. 6 is formed by overlapping bowl-shaped containers made of synthetic resin for accommodating food and wrapping them in a packaging film (not shown). Each container has a bottom surface, a circumferential surface, and an open top surface. The container has a cylindrical shape as a whole, but the bottom surface is a smaller diameter than the top surface. Accordingly, the in-line container 6 formed by overlapping containers is configured such that each container has one end 6-2 (in FIG. 6) exposed at the bottom surface thereof and the other end 6-1 (in FIG. 6) exposed at the top surface thereof in the longitudinal direction thereof, the diameter of one end being smaller than that of the other end.

This in-line container 6 is wrapped in the packaging film so that its longitudinal direction is parallel to the bottom or top of a rectangular parallelepiped packaging box 1 therein. In the packaging box, four in-line containers 4 are placed side by side and are vertically stacked in three rows, with a consequence that a total of 12 in-line containers are accommodated.

However, this in-line container 6 is only an example of the item accommodated in the packaging box, and the present disclosure is not limited to the form of the item or the stacked form in the packaging box. All items are applicable to the system of the present disclosure as long as they are arranged regularly in the same form in the packaging box 1.

Figure 2:
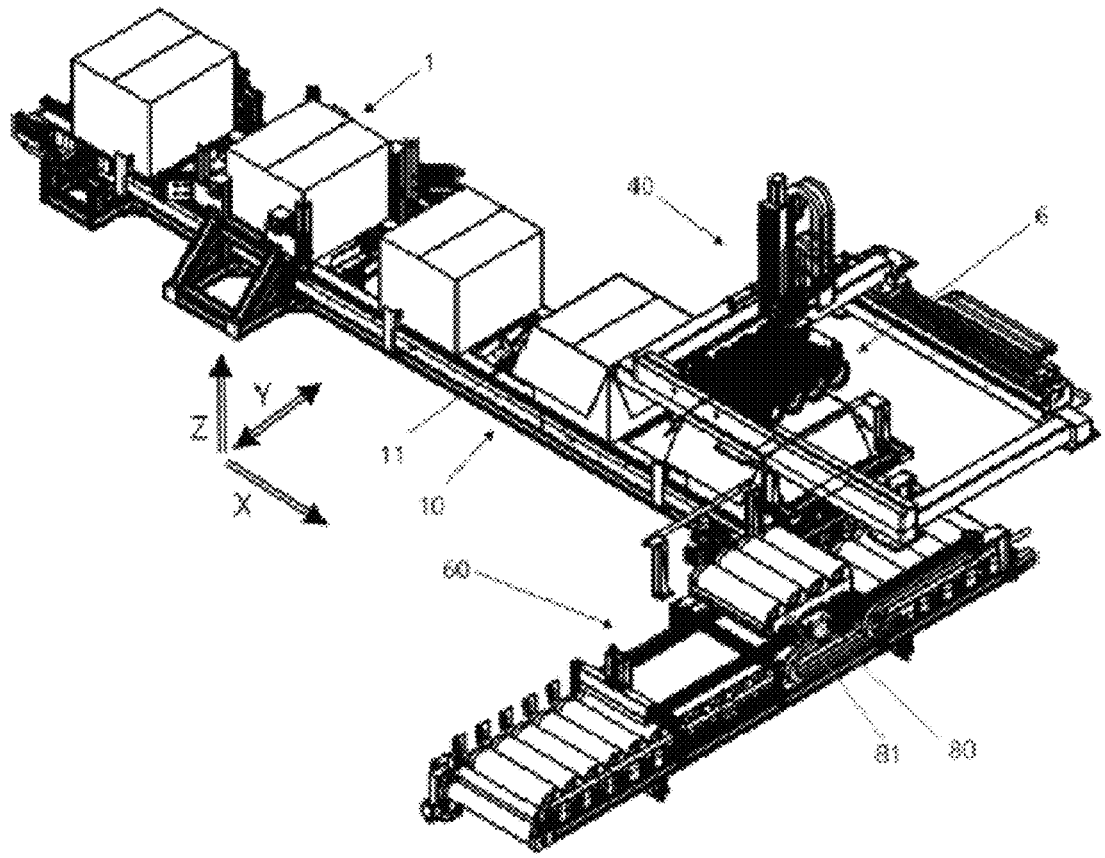
FIGS. 2 and 3 are perspective and side views illustrating an overall configuration of the system according to the embodiment of the present disclosure.
Figure 3:
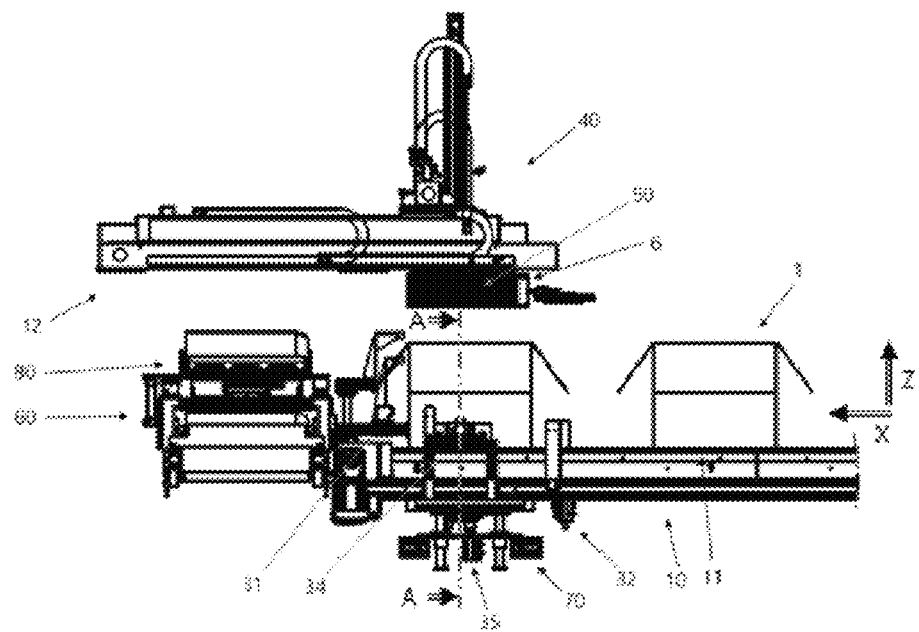

FIGS. 2 and 3 illustrate part of a unit for opening the packaging box 1 and unfolding the top thereof to take the in-line container 6 out of the packaging box 1, in addition to devices or mechanisms constituting the system according to the embodiment of the present disclosure.

The packaging box 1 is transferred to a withdrawal position beneath a withdrawal device 40 by a first conveyor 11 in a state in which the adhesive tape binding the upper panels 2 and 3 is cut and the four upper panels 2 to 5 are unfolded.

The system of the present embodiment largely includes a first conveyor 11 configured to transfer a packaging box 1 accommodating an in-line container 6 as an item to be taken out, four fixing plate devices 31 to 34 and one suction fixing device 35 as a fixing means for fixing the packaging box 1 at a position where the in-line container 6 is taken out of the packaging box 1, a withdrawal device 40 as a withdrawal means for moving to a space in which the in-line container 6 is accommodated in the packaging box 1 so as to take out the in-line container 6 by suctioning the same by means of vacuum suction, a first transfer conveyor 60 as an item transfer means for transferring the in-line container 6 taken out by the withdrawal device 40 with the in-line container 6 placed on the first transfer conveyor 60, a second transfer conveyor 70 as a box transfer means for discharging, out of the system, an empty packaging box 1 from which the in-line container 6 is taken out, a rotating device 80 rotated by 180 degrees in a state in which an in-line container 6, accommodated in a different direction from other in-line containers 6 in the packaging box 1, is taken out by the withdrawal device 40 and placed on the rotating device 80, and a frame 10 to which the above devices are coupled and supported.

The packaging box 1 accommodating the in-line container 6 is transferred by the first conveyor 11 to a position where the withdrawal device 40 is disposed. Although not illustrated in the drawings, a unit for unfolding the upper panels 2 to 5 of the packaging box is disposed around the first conveyor 11. Thus, the packaging box is opened at the top thereof before it is transferred by the first conveyor 11 toward the withdrawal device 40.

Figure 4:
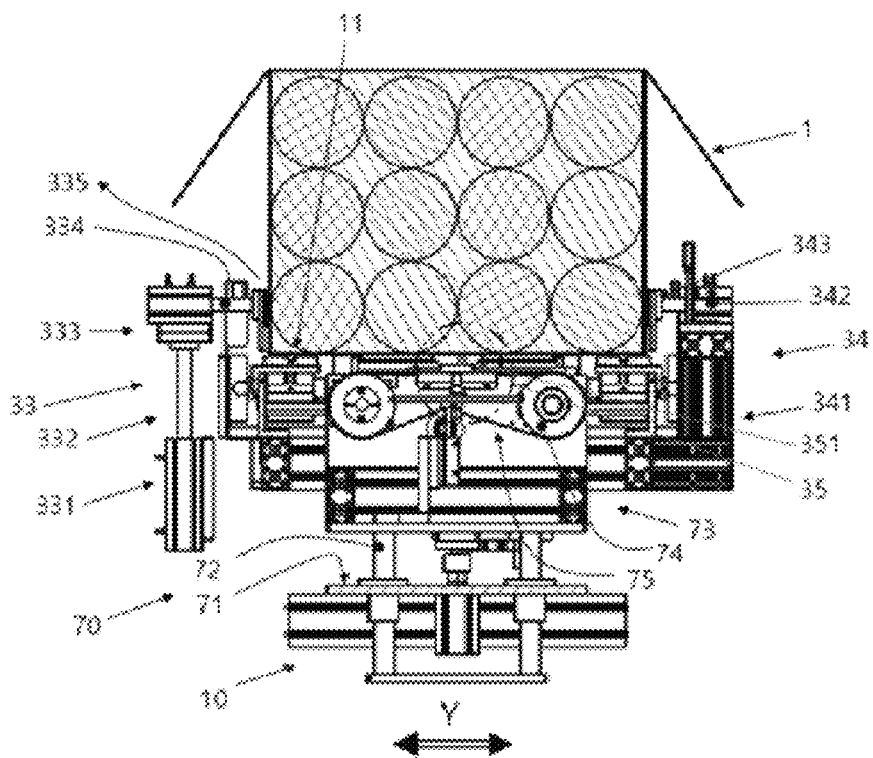
FIG. 4 is a cross-sectional view taken along line A-A of FIG. 3.

Referring to FIG. 4, the first conveyor 11 includes two conveyor belts parallel to each other. Thus, the first conveyor 11 transfers and supports the packaging box 1 before transferring an empty packaging box 1 from which the in-line container 6 is taken out by the withdrawal device 40.

When the packaging box 1 reaches a position where the withdrawal device 40 takes out the in-line container 6, the first conveyor 11 stops and the packaging box 1 is fixed to the withdrawal position by the four fixed plate devices 31 to 34 and one suction fixing device 35.

The four fixing plate devices 31 to 34 abut against the four sides of the packaging box 1, respectively.

The first fixing plate device 31 has a panel, which abuts against the packaging box, while facing the packaging box downstream in the transfer direction of the packaging box 1 (indicated by arrow X in FIG. 3). The second fixing plate device 32 has a panel, which abuts against the packaging box, while facing the packaging box upstream in the transfer direction of the packaging box 1.

Here, the second fixing plate device 32 is disposed between the two conveyor belts of the first conveyor 11. Accordingly, in order not to interfere with the transfer of the packaging box 1, the second fixing plate device 32 is maintained beneath the first conveyor 11 during the transfer of the packaging box, whereas it rises after the packaging box 1 stops at the withdrawal position so that its panel (not shown) protrudes and abuts against the side of the packaging box 1.

FIG. 4 illustrates the third and fourth fixing plate devices 33 and 34 and the suction fixing device 35. The third and fourth fixing plate devices 33 and 34 are spaced apart from and face each other in a width direction Y perpendicular to the transfer direction X to serve to fix both sides of the packaging box 1.

The third fixing plate device 33 includes a first block 331 fixed to the frame 10 beneath the first conveyor 11, a first pneumatic cylinder 332 actuated vertically from the first block 331, a second block 333 coupled to the tip of the first pneumatic cylinder 332, a second pneumatic cylinder 334 actuated horizontally from the second block 333, and a fixing plate 335 coupled to the tip of the second pneumatic cylinder 334 to abut against the side of the packaging box 1.

The second block 333 and the elements attached thereto are moved by the actuation of the first pneumatic cylinder 332 between a resting position on the bottom of the packaging box 1 and an operating position (state illustrated in FIG. 4) at which the fixing plate 335 abuts against the side of the packaging box 1 by rising from the resting position.

In the operating position, the second pneumatic cylinder 334 is actuated so that the fixing plate 335 protrudes and abuts against the side of the packaging box 1 to support the packaging box.

The fourth fixing plate device 34 includes a fixing block 341 fixedly coupled to the frame 10, a pneumatic cylinder 342 actuated horizontally from the fixing block, and a fixing plate 343 coupled to the tip of the pneumatic cylinder 342 to abut against the side of the packaging box 1.

The fixing plate 343 is spaced apart from the packaging box 1. When the packaging box 1 is transferred to a position for taking out the in-line container 6, the pneumatic cylinder 342 is actuated so that the fixing plate 343 moves horizontally toward the packaging box 1 and abuts against the side thereof.

The suction fixing device 35 is disposed beneath between the two conveyor belts of the 1st conveyor 11.

The suction fixing device 35 includes a vacuum aspirator 351 that abuts against the bottom of the packaging box 1 to perform vacuum suction. The vacuum aspirator 351 is connected to a vacuum source and is vertical movable (as indicated by arrow Z) by a pneumatic cylinder (not shown).

When the packaging box 1 is transferred to the withdrawal position, the vacuum aspirator 351 rises from the bottom of the first conveyor 11 by the pneumatic cylinder to suck and fix the packaging box 1, and then moves down again when all the in-line containers 6 are taken out so that the packaging box is empty.

The first to fourth fixing plate devices 31 to 34 and the suction fixing device 35 fix the four sides and bottom of the packaging box 1. Accordingly, these devices prevent the packaging box 1 from lifting up or shaking in the transfer direction or width direction thereof when each in-line container 6 is taken out of the packaging box 1 by the withdrawal device 40.

Referring back to FIGS. 2 and 3, the withdrawal device 40 is disposed above the fixing means.

The withdrawal device 40 is coupled to an upper frame 12 forming a part of the frame 10. A clamp 50 configured to directly clamp the in-line container 6 for taking it out is moved in the transfer direction X, the width direction Y, and the vertical direction Z with respect to the upper frame 12.

Figure 5:
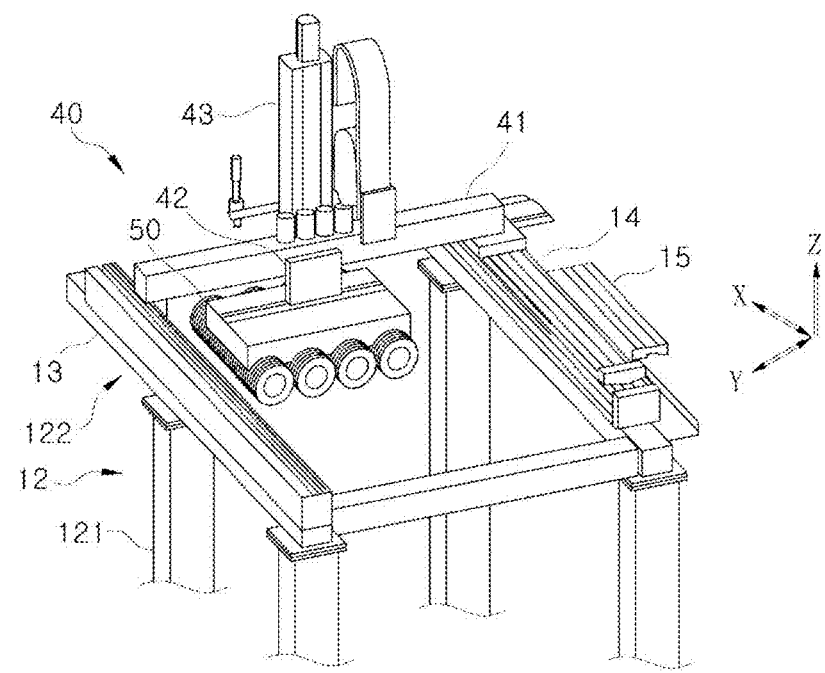
FIG. 5 is a perspective view illustrating a state in which a withdrawal device is mounted on a frame in the system according to the embodiment of the present disclosure.

First, the overall configuration of the withdrawal device 40 will be described with reference to FIG. 5.

The upper frame 12 is composed of four vertical channels 121 and four horizontal channels 122 forming a rectangle with each other. Among them, the two horizontal channels 122 extending in the transfer direction X and parallel to each other are provided with linear guides 13 and 14.

A mounting block 41 extends in the width direction Y across the linear guides 13 and 14. The mounting block 41 is movable in the transfer direction X by the transfer mechanism 15 provided in the linear guide 14.

The mounting block 41 is provided with a mounting bracket 42 movable in the longitudinal direction of the mounting block 41, i.e., in the width direction Y. The pneumatic piston 43 movable vertically is fixed to the mounting bracket 42, and the clamp 50 is coupled to the lower tip of the pneumatic piston 43. Accordingly, the clamp 50 is movable in the transfer direction X, the width direction Y, and the vertical direction Z.

The configuration of the clamp will be described with reference to FIGS. 6 to 10.

The clamp 50 has first and second blocks 51 and 52, which are disposed up and down and coupled to each other to form a clamping mechanism. The first block 51 has a fixing bracket 53 provided on the upper surface thereof to attach the clamp 50 to the tip of the pneumatic piston 43. The first block 51 has four sensors 54 attached side by side to the front side thereof in the transfer direction X to detect the direction of the in-line container 6.

Figure 10:
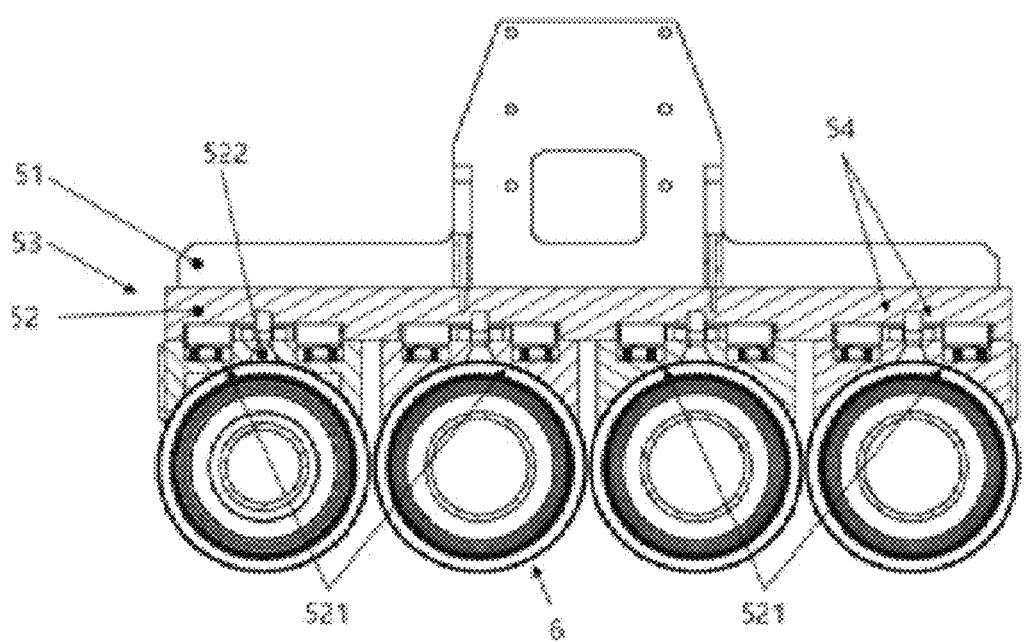

First, the configuration of the clamping mechanism will be described with reference to FIG. 10, which is a cross-sectional view taken along line D-D of FIG. 7 which is a top view of the clamp.

The second block 52 has four concave arc-shaped suction surfaces 521 provided on the lower surface thereof, and the top surface of each in-line containers 6 may be inserted into and abut against an associated one of the suction surfaces 521. A through-hole 522 for vacuum suction is formed at the center of each suction surface 521. The through-hole 522 extends outward through the first block 51 to be subjected to vacuum suction pressure from an external vacuum source.

The in-line container 6 is formed by wrapping a plurality of containers in a packaging film (not shown). The packaging film is sucked into the through-hole 522 by vacuum suction from the through-hole 522 and the packaging film on the in-line container 6 is pressed against the suction surface 521 by applying a negative pressure to the entire suction surface 521, thereby fixing the in-line container 6 to the clamp 50 in response to the load of the in-line container 6.

Meanwhile, two pins (54 in FIG. 10) are provided on both sides of the through-hole 522 to serve as a mechanism for fixing the plastic film drawn into the through-hole 522 by the negative pressure acting on the through-hole 522. The pins (54 in FIG. 10) are operated horizontally by a solenoid mechanism (not shown). After the plastic film on the in-line container 6 is drawn into the through-hole 522 by the vacuum suction pressure applied during clamping of the in-line container 6, the pins (54 in FIG. 10) move in an abutting direction and press and clamp the packaging film on the in-line container 6 therebetween.

Referring back to FIG. 6, the second block 52 is provided with the four suction surfaces 521 parallel to each other to suck the four in-line containers. Here, the length of each of the first and second blocks 51 and 52 is shorter than the length of the in-line container 6, and both longitudinal ends 6-1 and 6-2 of the in-line container 6 are exposed from the longitudinal ends of the clamp 50 during clamping.

The sensors 54 are provided on the side of the first block 51 to operate along and detect the diameter of the in-line container 6.

As described above, each of the containers forming the in-line container 6 is configured such that the open top surface thereof has a larger diameter than the bottom surface thereof. Therefore, when the in-line container 6 is formed by overlapping containers, the longitudinal end 6-1 of the in-line container 6 corresponding to the top surface thereof has a larger diameter than the longitudinal end 6-2 of the in-line container 6 corresponding to the bottom surface thereof.

Figure 7:
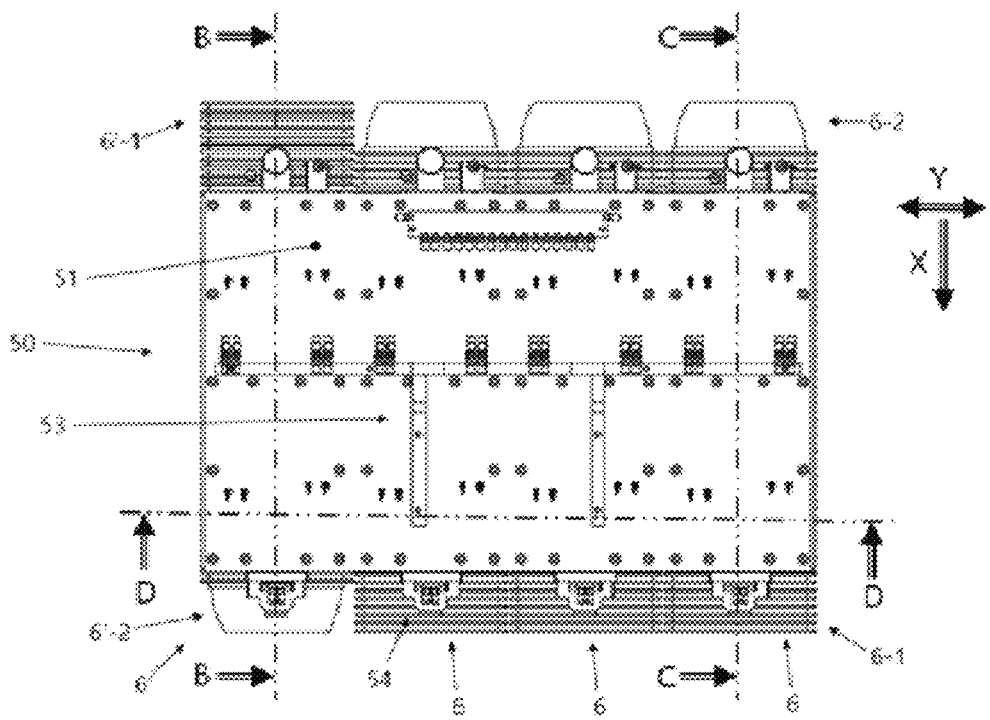

FIG. 7 illustrates four in-line containers clamped and taken out by the clamp 50. As an example, one in-line container 6' is different from other in-line containers 6 in that the bottom end 6'-1 thereof is placed on the side where the sensor 54 is disposed.

In the system of the present embodiment, the in-line containers 6 are taken out of the packaging box and aligned, and then transferred to a place of use with the plastic film thereon removed.

Accordingly, the in-line containers 6 taken out in the system of the present embodiment must be aligned in the same direction. However, if one in-line container 6' of the in-line containers 6 is placed in a different direction due to the operator's mistake when the in-line containers 6 are inserted into the packaging box 1, the in-line container 6' placed in a different direction is transferred to the next process as it is in the system for taking out, aligning, and transferring the in-line container 6. Hence, this causes a problem in the process of removing the packaging film from the in-line container 6 and supplying the containers.

Figure 8:
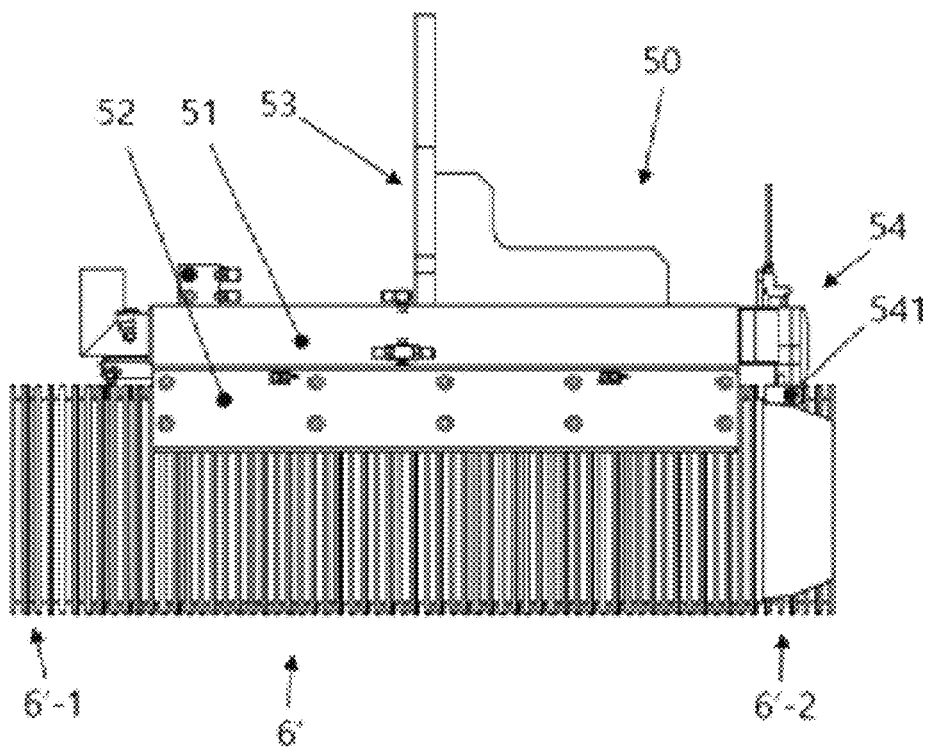
FIGS. 8 to 10 are cross-sectional views taken along lines B-B, C-C, and D-D of FIG. 7.
Figure 9:
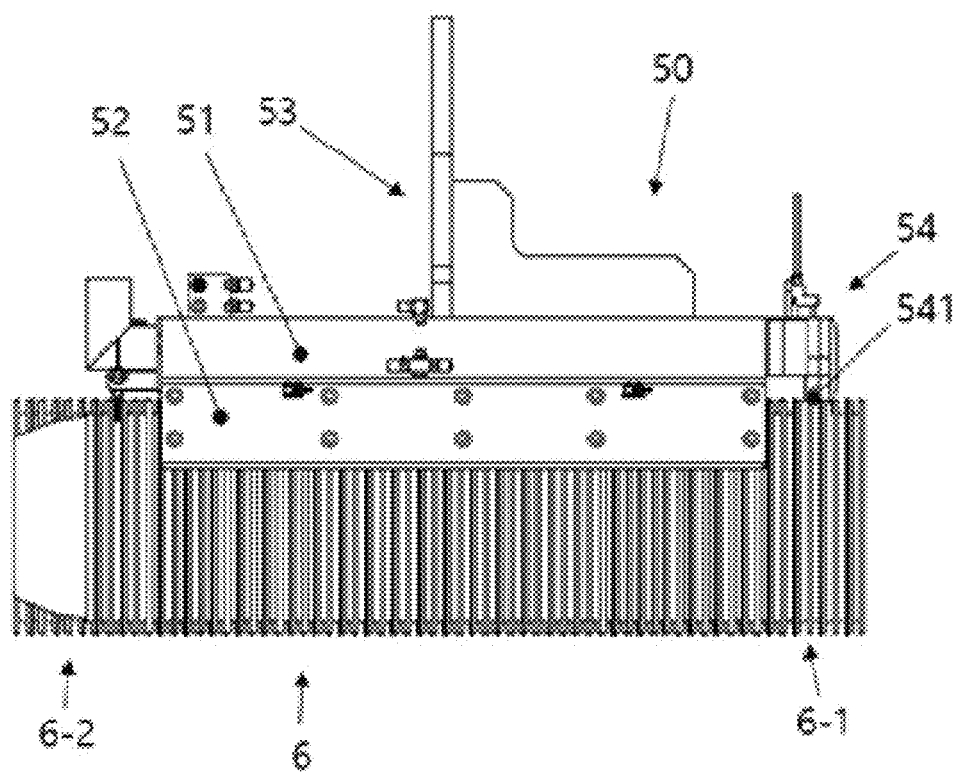

FIGS. 8 and 9, which are cross-sectional views taken along lines E-E and F-F of FIG. 7, are cross-sectional views illustrating that the in-line container 6 in a normal direction and the in-line container 6' in a different direction are clamped by the clamp 50.

Each sensor 54 includes a bar 541 fixedly coupled to the base plate 51 and moved up and down. The bar 541 moves upward when abutting against one end of the in-line container 6 or 6'. The bar 541 of the sensor 54, at the position where the in-line container 6 in the normal direction is clamped, is pushed upward. On the other hand, the bar 541 of the sensor 54, at the position where the in-line container 6' in the opposite direction is clamped, is not pushed upward because the bar 541 abuts against the bottom end 6'-2 of the in-line container 6'.

As such, the sensor 54 operates to detect the presence and position of the in-line container 6' placed in the opposite direction.

Referring back to FIGS. 2 and 3, the first transfer conveyor 60 and the rotating device 80 are disposed downstream of the withdrawal device 40, the first transfer conveyor 60 serves as a third conveyor of the item transfer means for transferring the in-line container 6 taken out by the withdrawal device 40 therethrough, and the rotating device 80 rotates the in-line container 6' placed in a different direction.

The first transfer conveyor 60 includes a conveyor belt on which the in-line containers 6 placed side by side in the same direction are transferred, so as to transfer them to the process of removing packaging films from in-line containers.

Meanwhile, the rotating device 80 is disposed above the first transfer conveyor 60. The rotating device 80 includes a table 81 configured to place four in-line containers 6, and the table 81 is rotated by 180 degrees by a drive motor and a power transmission device (not shown).

Accordingly, when the clamp 50 of the withdrawal device detects the in-line container 6' placed in the opposite direction, the clamp 50 places the in-line container 6 in the normal direction on the first transfer conveyor 60 and place the in-line container 6' in the opposite direction on the table 81 of the rotating device.

Subsequently, when the clamp 50 clamps the in-line container 6' again to place it on the first transfer conveyor 60 after the table 81 of the rotating device 80 is rotated by 180 degrees, the in-line container 6', which is placed in the opposite direction, is transferred after it is placed in a normal direction, like other in-line containers, on the first transfer conveyor 60.

Referring back to FIG. 4, the second transfer conveyor 70 as a box transfer means for transferring the empty packaging box 1 from which the in-line container 6 is taken out will be described.

All the in-line containers 6 are taken out of the packaging box 1, and the empty packaging box 1 is transferred to another position, and another packaging box is transferred to the withdrawal position by the first conveyor 11. The second transfer conveyor 70 as a second conveyor constituting a box transfer means is disposed beneath between the two conveyor belts of the first conveyor 11.

The second transfer conveyor 70 is provided with a block 71 fixedly coupled to the frame 10, and two cylinders 72 that move in the vertical direction Z with respect to the block 71 and are arranged side by side in the width direction Y. Each of the cylinders 72 has a conveyor mechanism 73 mounted to the tip thereof, and the conveyor mechanism 73 moves in the vertical direction Z by the cylinder 72.

The conveyor mechanism 73 is provided with two pulleys 74 spaced apart in the width direction Y and a belt 75 wound around the pulleys 74. The pulleys 74 are rotated by a drive motor (not shown) for circulation of the belt 75.

The conveyor mechanism 73 is disposed beneath the first conveyor 11. Thus, the conveyor mechanism 73 does not interfere with the bottom of the packaging box 1 when the packaging box 1 is transferred by the first conveyor 11. The conveyor mechanism 73 moves up when the cylinder 72 is actuated after all the in-line containers 6 are taken out of the packaging box 1.

The belt 75 of the conveyor mechanism comes into contact with the bottom of the packaging box 1 so that the packaging box 1 moves up to be spaced apart from the first conveyor 11. The belt 75 is circulated to transfer the packaging box 1 in the width direction Y.

Although not illustrated in the drawings, another conveyor for transferring an empty packaging box 1 is provided next to the first conveyor 11. Thus, the packaging box 1, which is moved in the width direction Y by the second transfer conveyor 70 and deviated from the withdrawal position, is removed from the system of the present embodiment.

The overall operation of the system having the above configuration will be described.

The packaging box 1 in which the in-line container 6 is accommodated through the first conveyor 11 and all the upper panels 2 to 5 are opened is transferred to the withdrawal position.

When the packaging box 1 is transferred to the withdrawal position, the first conveyor 11 stops, and the first to fourth fixing plate devices 31 to 34 and the suction fixing device 35 operate to support the packaging box 1 and fix it at the withdrawal position.

Next, the clamp 50 of the withdrawal device moves to the top of the packaging box 1 by the movement of the mounting block 41 in the transfer direction X and the movement of the mounting bracket 42 in the width direction Y. Next, the clamp 50 is moved downward by the operation of the pneumatic piston 43 to move into the packaging box 1 so that the four containers of the in-line container 6 are placed on the respective suction surfaces 521.

The packaging box 1 is transferred in the state in which it is disposed such that the longitudinal direction of the in-line container 6 is the transfer direction X when the packaging box 1 is placed on the first conveyor 11. The clamp 50 is also fixed to the tip of the pneumatic piston 43 such that the longitudinal direction of each suction surface 521 is the transfer direction X.

When the in-line container 6 is placed on the suction surface 521, the in-line container 6 is fixed by vacuum suction and subsequent pins so that it is fixed to the clamp 50. Next, the clamp 50 moves to the first transfer conveyor 60 by the operation of the withdrawal device 40, and the fixation of the in-line container 6 by the vacuum suction and the pins is released so that the containers of the in-line container 6 are transferred side by side by the first transfer conveyor 60.

Meanwhile, when the sensor 54 detects an in-line container 6' placed in an opposite direction, the clamp 50 first moves above the rotating device 80 and operates to release the in-line container 6' from the suction surface 521 associated therewith to place the in-line container 6' on the table 81 of the rotating device. Then, the clamp 50 moves to the first transfer conveyor 60 to release the other in-line containers 6 and place them on the first transfer conveyor 60.

After the in-line container 6' is placed in a normal direction by rotating the table 81 of the rotating device 80 by 180 degrees, the clamp 50, which places the in-line container 6 in the normal direction on the first transfer conveyor 60, moves to the rotation device 80 to clamp the in-line container 6' from the rotation device 80. Next, the clamp 50 moves to the first transfer conveyor 60 and places the clamped in-line container 6' from the rotating device 80 on the first transfer conveyor 60.

When all the in-line containers 6 are taken out of the packaging box 1 by repeating this process, the second transfer conveyor 70 rises from the bottom of the first conveyor 11 to separate the empty packaging box 1 from the first conveyor 11. Next, the belt 75 is circulated to move the empty packaging box 1 out of the system from the withdrawal position.

In this way, the packaging box 1 accommodating the in-line container 6 is introduced into the system of the present embodiment, and the in-line container 6 is taken out by the withdrawal device 40 and transferred to the subsequent process by the first transfer conveyor 60. The empty packaging box is removed from the system by the first transfer conveyor 60 and transferred to the subsequent process.

Although the system for taking out in-line containers according to the embodiments of the present disclosure has been described in terms of configuration and operation thereof, the present disclosure is not limited to such embodiments and various modifications and additions of elements are possible within the spirit and scope of the disclosure as defined in the following claims.

The invention claimed is:

1. A system for taking out items wrapped in a packaging film and accommodated in a packaging box with an open top, comprising:

a first conveyor configured to transfer a packaging box accommodating items therein;

a fixing means for fixing, at a withdrawal position where the items are taken out of the packaging box, the packaging box transferred by the first conveyor with its top open;

a withdrawal means for moving to a space in which the items are accommodated in the packaging box so as to suck and take out the items;

an item transfer means for transferring the items taken out by the withdrawal means with the items placed on the item transfer means; and a box transfer means for transferring an empty packaging box from which the items are taken out;

wherein, the items are stacked to form a cylinder as a whole, and are arranged in the packaging box such that the cylinder of stacked items has an axis parallel to a direction transferred by the first conveyor;

wherein the withdrawal means is provided with a concave arc-shaped suction surface having a diameter corresponding to the diameter of each item, and the suction surface is provided with a through-hole in communication with an external vacuum source for suctioning the packaging film of the item by vacuum;

wherein, the item has both longitudinal ends having different diameters;

wherein the withdrawal means is provided with a sensor configured to detect the diameter of one end of the item;

wherein, the item transfer means comprises a third conveyor, on which the item taken out by the withdrawal means is placed and transferred, and a rotating device on which the item taken out by the withdrawal means are placed and rotated by 180 degrees; and when the diameter of one end of the item detected by the sensor is different from the diameter of one end of another item, the withdrawal means loads the associated item onto the rotating device, and sucks and loads the associated item onto the third conveyor after the rotating device rotates.

2. The system according to claim 1, wherein:

the packaging box is transferred in a first direction to the withdrawal position by the first conveyor;

the empty packaging box from which the items are taken out is transferred in a second direction perpendicular to the first direction by the box transfer means;

the first conveyor comprises two conveyor belts extending parallel to each other in the first direction; and the box transfer means is composed of a second conveyor disposed beneath between the conveyor belts of the first conveyor at the withdrawal position, and after the items are taken out of the packaging box by the withdrawal means, the box transfer means rises above the conveyor belts of the first conveyor and is driven in contact with a bottom of the packaging box to transfer the empty packaging box in the second direction.

3. The system according to claim 1, wherein the sensor comprises a bar disposed at one longitudinal end of the item to be pressed and protrude toward the axis of the item in a radial direction of the item, and the sensor detects which end of both ends of the item is in contact with the bar according to a protruding length of the bar.

4. The system according to claim 1, wherein the fixing means comprises a suction device configured to move up and down beneath the packaging box and suck a bottom of the packaging box when the items are taken out of the packaging box.

* * * * *